United States Patent [19]
Yamamoto et al.

[11] 3,870,738
[45] Mar. 11, 1975

[54] PROCESS FOR MANUFACTURING GASES RICH IN METHANE

[75] Inventors: Kenzo Yamamoto; Seiichi Matsuoka, both of Yokohama; Toshio Shioda, Yokosuka, all of Japan

[73] Assignee: Japan Gasoline Co., Ltd., Tokyo, Japan

[22] Filed: Jan. 23, 1973

[21] Appl. No.: 326,007

[30] Foreign Application Priority Data
Jan. 24, 1972 Japan................................. 47-9296

[52] U.S. Cl.... 260/449 S, 260/449.6 S, 260/449 M, 252/373
[51] Int. Cl............................ C07c 1/02, C07c 1/04
[58] Field of Search....... 260/449 M, 449 S, 449.6 S

[56] References Cited
UNITED STATES PATENTS

| | | | |
|---|---|---|---|
| 2,433,255 | 12/1947 | Atwell | 260/449 L |
| 2,692,274 | 10/1954 | Kolbel et al. | 260/449 L |
| 2,775,512 | 2/1972 | Leithanger et al. | 260/449 S |
| 3,511,624 | 5/1970 | Humphries et al. | 260/449 M |
| 3,625,665 | 12/1971 | Thompson | 260/449 M |
| 3,642,460 | 2/1922 | Leithanser | 260/449 M |

*Primary Examiner*—Howard T. Mars
*Attorney, Agent, or Firm*—Woodhams, Blanchard and Flynn

[57] ABSTRACT

A process for manufacturing gases rich in methane, wherein a mixture of feed hydrocarbon containing at least two carbon atoms in the molecule and steam is subjected to adiabatic low temperature steam reforming reaction to form a reformed gas substantially comprising methane, hydrogen, carbon monoxide, carbon dioxide and steam. Then the reformed gas is divided into two streams and one of them is introduced in the first stage of plural methanization reaction zones arranged in series at a temperature of 200° – 550°C under a pressure of 0 – 150 Kg/cm²G, while the other is cooled, and after removing the condensed water is introduced in the second and, if present, subsequent methanization reaction zones, to subject the reformed gas to adiabatic methanization reaction.

6 Claims, 2 Drawing Figures

PROCESS FOR MANUFACTURING GASES RICH IN METHANE

BACKGROUND OF THE INVENTION

1. Field of the Invention

The present invention relates to a process for obtaining gases of extremely high methane contents. More particularly, the invention relates to a process for manufacturing a gas comprising substantially methane by subjecting the reformed gas obtained by steam reforming of hydrocarbons to methanization reaction.

2. Prior Art of the Invention

Hydrogenation of carbon monoxide or carbon dioxide, i.e. methanization, is an exothermic reaction which is carried out preferably at a low temperature from the viewpoint of equilibrium. In this connection, a process for effecting the reaction at an optimum temperature level by controlling temperature elevation in a methanization reaction vessel has been proposed, which process comprises keeping the temperature of feed materials introduced into the reaction vessel at a relatively low temperature. However, when the reformed gas obtained by steam reforming of hydrocarbons is used as the feed material introduced in the methanization reaction vessel, the temperature of the feed gas cannot be lowered greatly, since water drops are formed as the temperature of the reformed gas falls below its dew point owing to steam contained in the gas, thereby exerting a detrimental influence upon the catalyst activity and also causing corrosion of the apparatus.

Furthermore, a process wherein plural methanization reactors are provided and coolers are arranged in a space between the reactors to control heat generation has been proposed. However, such a process causes an increase in the number of the reactors and coolers and also in usage of coolant and, owing to the combination of reactor-cooler-reactor, the operation in the initial stage must be a low load operation.

SUMMARY OF THE INVENTION

The present invention relates to a process for manufacturing gases rich in methane, characterized in that a mixture of feed hydrocarbon containing at least two carbon atoms in the molecule and steam is subjected to adiabatic steam reforming reaction at a temperature of 350° – 550°C under a pressure of 0 – 100 Kg/cm$^2$G to form a reformed gas substantially comprising methane, hydrogen, carbon monoxide, carbon dioxide and steam. Then the reformed gas is divided into two streams and one of them is introduced in the first stage of plural methanization reaction zones arranged in series at a temperature of 200° – 550° C under a pressure of 0 – 150 Kg/cm$^2$G, while the other is cooled, and after removing the condensed water, is introduced in the second and, if present, subsequent methanization reaction zones, to subject the reformed gas to adiabatic methanization reaction.

DETAILED DESCRIPTION OF THE INVENTION

Figure 1:
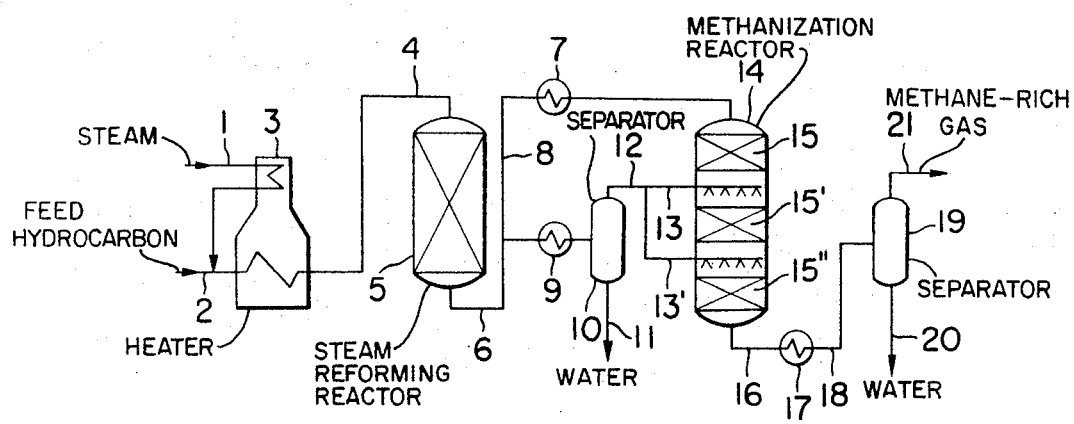
FIG. 1 is a flow diagram showing an embodiment of the process of the present invention in which 3 is a heater, 5 is a steam reforming reactor, 7, 9 and 17 are heat exchangers, 10 and 19 are gas-liquid separators, 14 is a methanization reactor, 15, 15' and 15" are catalyst layers, and 1, 2, 4, 6, 8, 11, 12, 13, 13', 16, 18, 20 and 21 are respective conduits.

The process of the present invention has been attained after intensive investigations for the purpose of eliminating the above described disadvantages of conventional methods. According to the process of the invention, it is possible to carry out the methanization reaction smoothly to form gas comprising substantially methane. The present invention relates to a process for manufacturing gases rich in methane, characterized in that a mixture of feed hydrocarbon containing at least two carbon atoms in the molecule and steam, is subjected to an adiabatic steam reforming reaction at a temperature of 350° – 550°C under a pressure of 0 – 100 Kg/cm$^2$G to form a reformed gas substantially comprising methane, hydrogen, carbon monoxide, carbon dioxide and steam. Then the reformed gas is divided into two streams and one of them is introduced into the first stage of plural methanization reaction zones arranged in series at a temperature of 200 – 550°C under a pressure of 0 – 150 Kg/cm$^2$G, while the other is cooled, and after removing the condensed water, is introduced in the second and, if present, subsequent methanization reaction zones, to subject the reformed gas to adiabatic methanization reaction.

The reformed gas introduced in the methanization reaction zone in the process of the present invention is obtained by a usual gasification technique wherein a mixture of feed hydrocarbon containing at least two carbon atoms in the molecule such as refinery off gas, LPG, light naphtha, heavy naphtha or kerosene and steam is contacted adiabatically with a nickel catalyst at a temperature of 350° – 550°C under a pressure of 0 – 100 Kg/cm$^2$. Preferably steam is used in an amount of 0.1 – 5.0 moles per one carbon atom of the feed hydrocarbon. The reformed gas thus obtained is a mixture mainly comprising methane, hydrogen, carbon monoxide, carbon dioxide and steam. A part of the gas may be recycled in a desulfurization stage prior to the steam reforming reaction stage. According to the present invention, the remainder is divided into the two streams and one of them is introduced directly into the first stage of plural methanization reaction zones arranged in series at a temperature of 200°–550° C under a pressure of 0 – 150 Kg/cm$^2$G, while the other is cooled, and after removing condensed water is introduced in the second, if present, subsequent methanization reaction zones. Thus, according to the present invention, each methanization reaction zone can be kept at a temperature of 200° – 550°C under a pressure of 0 – 150 Kg/cm$^2$G whereby the adiabatic methanization reaction can be performed smoothly.

The number of the methanization reaction zones is preferably two or three. Any variation may be made in connection with the said methanization reaction conditions, with respect to the proportion of the reformed gas to be introduced directly in the methanization reaction zone, to the reformed gas to be cooled and dehydrated; the manner of the introduction of the cooled, dehydrated reformed gas in the second, if present, subsequent reaction zones; and temperature at the time of the introduction. The methanization catalysts used are the usual catalysts for the methanization reaction, and reduced nickel catalysts are especially preferred.

The process of the invention is illustrated more concretely with reference to the accompanying drawings. In FIG. 1, steam and feed hydrocarbon are introduced into a heating furnace 3 through lines 1 and 2, respectively and heated to 350°–550°C. Thus heated gas mixture is introduced in a reactor 5 which is filled with a steam reforming reaction catalyst, through a line 4. The steam reforming reaction is carried out in the reactor 5. The reformed gas which flows out through a line 6 is a gas mixture mainly comprising methane, hydrogen, carbon monoxide, carbon dioxide and steam. The reformed gas is then divided into two streams and one of them is fed in an upper portion of a methanization reactor 14 through a line 8. The temperature of the reformed gas introduced in the methanization reactor 14 is preferably in the range of 200°–550°C. If the temperature of the gas in the line 6 is beyond this range, a heat exchanger 7 is used to control the temperature of the reformed gas. As the reformed gas in the methanization reactor descends through catalyst layers 15, 15' and 15'', the temperature is raised owing to the exothermic reaction.

the remainder of the reformed gas, i.e. the total reformed gas minus that which flows through the line 8, is cooled by a heat exchanger 9, and condensed water is removed through a line 11 by a gas-liquid separator 10. The cooled and dehydrated refromed gas is introduced in part between the catalyst layers 15 and 15' and in part between the catalyst layers 15' and 15'' in the methanization reactor 14 through lines 13 and 13', respectively. The number of the divided parts from the cooled and dehydrated reformed gas is determined according to the number of the methanization reaction zones. For example, if two methanization reaction zones are provided, the division is unnecessary and, if three zones are provided, the division into two streams is required. The temperature of the cooled gas introduced therein which is controlled by the heater exchanger 9 should be determined so that methane concentration in a line 16 is maximum.

The outlet gas from the methanization reactor is sent into a gas-liquid separator 19 through the line 16, a heat exchanger 17 and a line 18. In the separator 19, water is removed through line 20 to obtain the gas rich in methane through a line 21. The resulting gas is finally subjected to a conventional carbon dioxide removing treatment to obtain the desired gas comprising substantially only methane.

Figure 2:
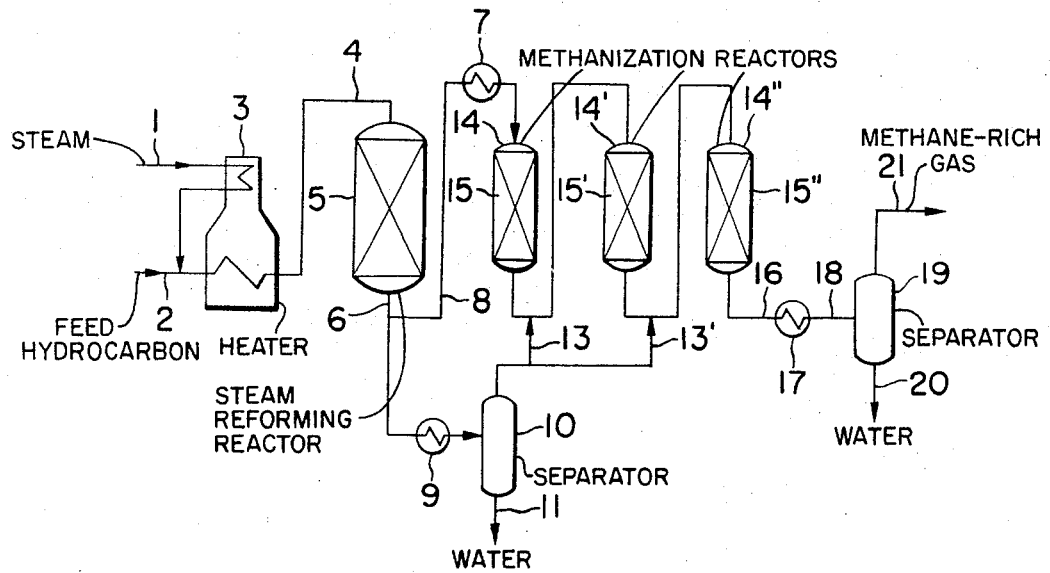
FIG. 2 is a flow diagram showing another embodiment of the process of the invention, wherein 14, 14' and 14" are methanization reactors and the other reference numbers identify the same parts as in FIG. 1.

While the plural methanization reaction zones (catalyst layers) are provided in one single reactor in the embodiment in FIG. 1, it will be understood that the process of the present invention may be carried out as in FIG. 2 wherein plural reactors are provided in series, each reactor having only one methanization reaction zone.

Thus, as compared with the conventional techniques wherein a combination of methanization reactor-cooler-methanization reactor is employed, the reaction steps are simplified markedly according to the process of the invention and, therefore, usage of, for example, cooling water may be small, and, furthermore, the temperature of the reformed gas to be introduced into the methanization reactor may be relatively high, because the methanization reaction zones can be cooled by the gas to be methanized. Consequently, the methanization reaction velocity is increased and the overall catalyst charged in the reactor is reduced in amount.

EMBODIMENT OF THE INVENTION

As feed hydrocarbon, naphtha having an average carbon number of 6.19/molecule, IBP of 36.5°C, FBP of 139°C and specific gravity $d_4^{15}$ of 0.687 was used. The starting naphtha was introduced into an adiabatic reactor charged with a nickel catalyst carried on diatomaceous earth, at a proportion of 1.2 moles of steam per carbon atom of the naphtha and at a mass velocity of 4,000 Kg/m²hr., at an inlet temperature of 495°C. Steam reforming was carried out under a pressure kept at 24.0 Kg/cm²G. Outlet temperature was 510°C. Composition of the resulting reformed gas was as follows:

| | |
|---|---|
| $CH_4$ | 30.34 mol. % |
| $H_2$ | 9.21 |
| $CO$ | 0.48 |
| $CO_2$ | 11.73 |
| $H_2O$ | 48.24 |

The reformed gas was treated (i) first for comparison by conventional methanization method and then (ii) by the process of the present invention.

i. Conventional method:

The reformed gas was methanized in an adiabatic methanization reactor at a space velocity of 10,000 hr⁻¹, at a reactor inlet temperature of 217°C under a reaction pressure of 20 Kg/cm²G. As catalyst, 100 g of a methanization catalyst were used which catalyst was obtained by precipitating 37% of nickel and 4% of copper/chromium/manganese oxide on a silica carrier and shaping it together with 15% of magnesium oxide into tablets.

The reactor outlet temperature of the gas obtained by the technique was 320°C. The composition was as follows:

| | Resulting gas composition | Gas composition after removal of $CO_2$ |
|---|---|---|
| $CH_4$ | 75.02 mol. % | 97.48 mol. % |
| $H_2$ | 1.93 | 2.51 |
| $CO$ | 0.01 | 0.01 |
| $CO_2$ | 23.04 | — | ii. Process of the present invention:

A part of said reformed gas was introduced in the first catalyst layer of three independent layers of a methanization reactor filled with 60 g in total of said methanization catalyst at a temperature of 217°C. On the other hand, the remainder of the reformed gas was cooled to 40°C, and after removing the condensed water was introduced in parts between the catalyst layers. The amount of gas introduced in the part between the first and the second catalyst layers was 1.5 parts and that introduced in the part between the second and the third catalyst layers was 2.0 parts per part of the gas introduced in the first catalyst layer calculated on a day basis. The reaction was carried our at an overall space velocity of 16,000 hr⁻¹ under a pressure of 20 Kg/cm²G. The reactor outlet temperature was 279°C, and the composition of the resulting gas was as follows:

|  | Resulting gas composition | Gas composition after removal of $CO_2$ |
|---|---|---|
| $CH_4$ | 76.65 mol. % | 99.45 mol. % |
| $H_2$ | 0.42 | 0.54 |
| CO | 0.01 | 0.01 |
| $CO_2$ | 22.92 | — |

A further experiment was performed wherein the inlet temperature of the adiabatic methanization reactor of method i) was decreased so that methane concentration at the outlet of the adiabatic methanization reactor of method i) was equal to the methane concentration at the outlet of the methanization reactor of process ii). However, on this occasion, the temperature of the gases in the menthanization reactor of technique i) was lower than the dew point thereof and, therefore, the catalyst was submerged and inactivated.

Both of the above experiments i) and ii) were carried out at a temperature above 200°C, because the activity of the nickel catalyst is very low at a temperature below 200°C. At such a temperature level, the gas product of only about 75% methane content can be obtained by technique i), and, it is quite difficult according to the conventional technique to obtain a methane content above 76%, i.e. to obtain 98 – 99% methane content after the decarboxylation stage.

What we claim is:

1. In a process for producing a gas rich in methane wherein a gaseous mixture of feed hydrocarbon containing at least two carbon atoms and steam is subjected to steam reforming in contact with a reforming catalyst at a temperature within the range of 350°C and 550°C and a pressure within the range of 0 kg/cm²G and 100 kg/cm²G to produce an effluent stream of reformed gas mixture comprising as constituent gases methane, water, hydrogen, carbon monoxide and carbon dioxide, and subjecting the said effluent steam of reformed gas to exothermic methanization by passing it through a reaction zone under methanization reaction conditions of a temperature in the range of 2,000°C to 550°C and a pressure in the range of 0 kg/cm²G and 150 kg/cm²G and in contact with methanization catalyst to produce a methane-rich gas, the improvement which comprises:

dividing said effluent stream of reformed gas into two stream parts to constitute a first stream part and a second stream part;

flowing through a first methanization reaction zone containing methanization catalyst and under said methanization reaction conditions, only said first stream part containing all of said constituent gases to obtain a first methanized reaction product gas;

cooling said second stream part to condense the water therein and separating the condensed water from the remainder of said second stream part to obtain a dewatered gaseous second stream part;

flowing said dewatered gaseous second stream part conjointly with said first methanized reaction product gas through one or more additional methanization reaction zones containing methanization catalyst and under said methanization reaction conditions, said additional methanization reaction zone or zones being separate from said first methanization zone and connected in series with said first methanization zones and all of the methanization reactions being carried out adiabatically, and separating from the last of the methanization reaction zones an effluent gas enriched in methane.

2. A process for manufacturing gases rich in methane according to claim 1, characterized in that refinery off gas, LPG, light naphtha, heavy naphtha or kerosene is used as the feed hydrocarbon.

3. A process for manufacturing gases rich in methane according to claim 1, characterized in that two or three methanization reaction zones are employed as the plural methanization reaction zones arranged in series.

4. A process for manufacturing gases rich in methane according to claim 1, characterized in that said plural methanization reaction zones are provided in a single methanization reactor.

5. The method of claim 4, wherein said effluent gas rich in methane is subsequently subjected to a step of removal of carbon dioxide.

6. A process for manufacturing gases rich in methane according to claim 1, characterized in that said plural methanization reaction zones are provided separately in plural methanization reactors.

* * * * *

UNITED STATES PATENT OFFICE
CERTIFICATE OF CORRECTION

Patent No. 3,870,738             Dated March 11, 1975

Inventor(s) Kenzo Yamamoto, Seiichi Matsuoka and Toshio Shioda

It is certified that error appears in the above-identified patent and that said Letters Patent are hereby corrected as shown below:

Col. 5, line 43; please change "2000°C" to read

---200°C---.

Col. 6, line 21; please change "zones" to read ---zone---.

Signed and sealed this 1st day of July 1975.

(SEAL)
Attest:

RUTH C. MASON
Attesting Officer

C. MARSHALL DANN
Commissioner of Patents
and Trademarks